United States Patent
Thorat et al.

(10) Patent No.: US 12,067,003 B2
(45) Date of Patent: Aug. 20, 2024

(54) PERFORMANCE ENHANCEMENT FOR WRITING DATABASE PAGES

(71) Applicant: SAP SE, Walldorf (DE)

(72) Inventors: Padmaja Dhairyasheel Thorat, Pune (IN); Amit Pathak, Pune (IN); Mukundakrishnan Parthasarathy, Mumbai (IN)

(73) Assignee: SAP SE, Walldorf (DE)

( * ) Notice: Subject to any disclaimer, the term of this patent is extended or adjusted under 35 U.S.C. 154(b) by 80 days.

(21) Appl. No.: 17/994,583

(22) Filed: Nov. 28, 2022

(65) Prior Publication Data
US 2024/0176772 A1 May 30, 2024

(51) Int. Cl.
*G06F 16/23* (2019.01)
*G06F 9/52* (2006.01)
*G06F 16/22* (2019.01)

(52) U.S. Cl.
CPC .......... *G06F 16/2379* (2019.01); *G06F 9/526* (2013.01); *G06F 16/2228* (2019.01)

(58) Field of Classification Search
CPC ... G06F 16/2379; G06F 16/2228; G06F 9/526
See application file for complete search history.

(56) References Cited

U.S. PATENT DOCUMENTS

| 2005/0177590 A1* | 8/2005 | Chen ...................... G06F 16/284 707/999.102 |
| 2016/0314161 A1* | 10/2016 | Wen ..................... G06F 16/2329 |

\* cited by examiner

*Primary Examiner* — Loc Tran
(74) *Attorney, Agent, or Firm* — Buckley, Maschoff & Talwalkar LLC (57) ABSTRACT

A system and method including receiving a request to update a timestamp associated with database pages of a database instance logically organized into at least one page set, each of the at least one page set including a plurality of the database pages; updating the timestamp associated with each database page in each respective at least one page set; issuing, in response to updating the timestamp associated with a last database page in each of the at least one page set, a write request to write the plurality of database pages in each of the respective at least one page set to a persistent data store; and writing the plurality of database pages in each of the respective at least one page set to a persistent data store, the plurality of database pages written to the persistent data store having an updated timestamp associated therewith.

15 Claims, 7 Drawing Sheets

PERFORMANCE ENHANCEMENT FOR WRITING DATABASE PAGES

BACKGROUND

A database system typically stores large amounts of data in the form of database tables. Client applications access this data by transmitting queries to the database system. For example, a database management system receives a query from a client application, generates a query execution plan, executes the query execution plan upon its database tables, and returns a result set to the client application.

Database pages may include a number of attributes that facilitate the management and processing of the database pages in the course of performing one or more database operations. Database operations, including for example, the creating, modifying, managing, retrieval, deletion, and recovery of database pages, might use a timestamp associated with each database page to perform the database operations. In some scenarios, the timestamps associated with a database might be repaired, reset, or otherwise modified. For example, when a database timestamp approaches its maximum limit for the database, the timestamp on each database page might need to be reset. The execution of such a process to reset the timestamp of every database page in the database can be computationally expensive.

Accordingly, it would therefore be desirable to provide systems and methods to improve an efficiency of writing database pages.

DETAILED DESCRIPTION

The following description is provided to enable any person in the art to make and use the described embodiments. Various modifications, however, will remain readily apparent to those in the art.

In some aspects of the present disclosure, one embodiment includes a system and process to write database pages logically organized in groups or sets of database pages (i.e., page sets), wherein each page set including a plurality of database pages is written just once. In some aspects, technical benefits and advantages provided by the present disclosure include, for example, efficient and accurate systems and methods to improve, for example, throughput of writing database pages logically organized into at least one page set that includes a plurality of the database pages in each page set. One example case of a practical application of the present disclosure includes writing, in an efficient manner as disclosed herein, database pages of a database in an instance the timestamps associated with (i.e., for) the database are reset. In some instances, the time required to write the database pages in accordance with the present disclosure may be significantly reduced compared to other, previous database page writing techniques. Some of these other, previous database page writing techniques might issue writes on a per database page basis. In some aspects, an embodiment herein may issue database page writes on a per page set basis.

Figure 1:
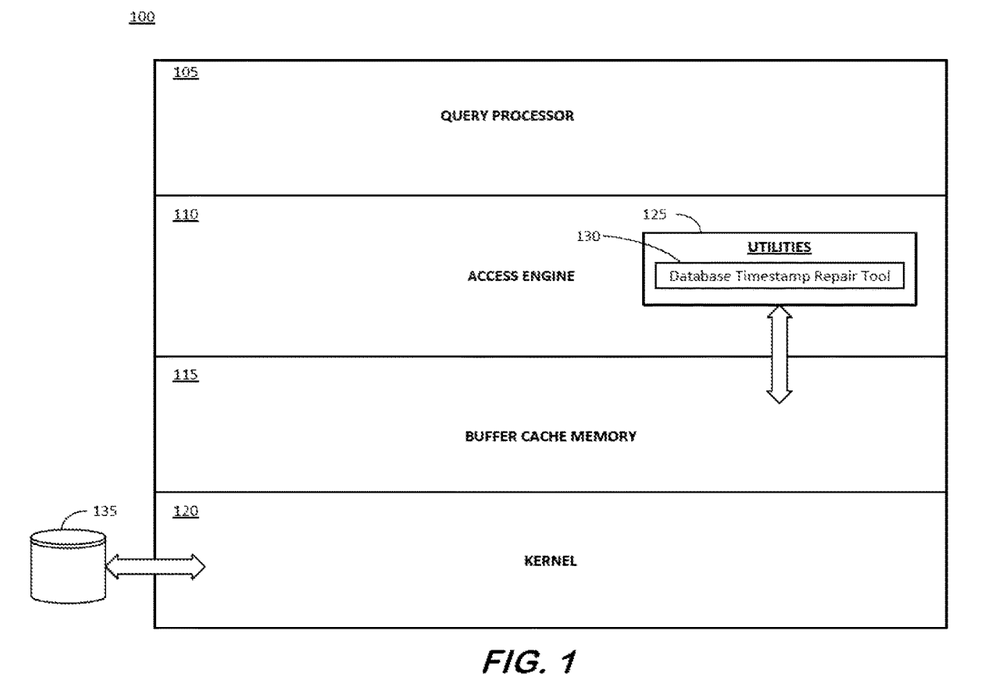
FIG. 1 is an illustrative depiction of a system architecture, according to an example embodiment.

FIG. 1 is an illustrative depiction of an overall database system architecture 100, according to an example embodiment. System architecture 100 includes the major components of a query processor 105, an access engine 110, a buffer cache manager 115, and a kernel 120. In general terms, the query processor 105 receives query requests, parses the requests, generates a query execution plan, executes the plan, and returns a query result. Access engine 110 may provide functionality for the database to execute various operations including the creating, reading, updating, and deletion of data from the database, as well as other more complex functions that rely on these primary functions. Buffer cache manager 115, in general, manages buffer cache memory to allow the efficient querying and accessing of frequently accessed data quickly. Kernel 120, generally manages access to data persisted by the database in, for example, a persistent data store 135, and processes, for example, SQL (structured query language) statements.

In some embodiments, access engine 110 might include one or more utilities 125, where each utility might be configured to perform one or more specified tasks when executed. In one illustrative example, utilities 125 includes a database timestamp repair tool 130. Database timestamp repair tool 130 might be invoked or otherwise called upon to execute when a database timestamp approaches or reaches its maximum limit (e.g., 0xff ffff). Database timestamp repair tool 130 might, in response to being invoked, operate to reset the timestamp on every page in the database.

In some aspects, a task, function, operation, or process to write (or rewrite) an entire database or a portion thereof (e.g., a database table) might include, be included in, or triggered by a number of different database or database table utilities. Accordingly, some aspects of the present disclosure might not be limited to writing (or rewriting) database pages in conjunction with a database timestamp reset operation. That is, some aspects of the database page writing (or rewriting) processes and systems disclosed herein might be leveraged as part of tasks other than or in addition to a database timestamp reset operation.

Figure 2:
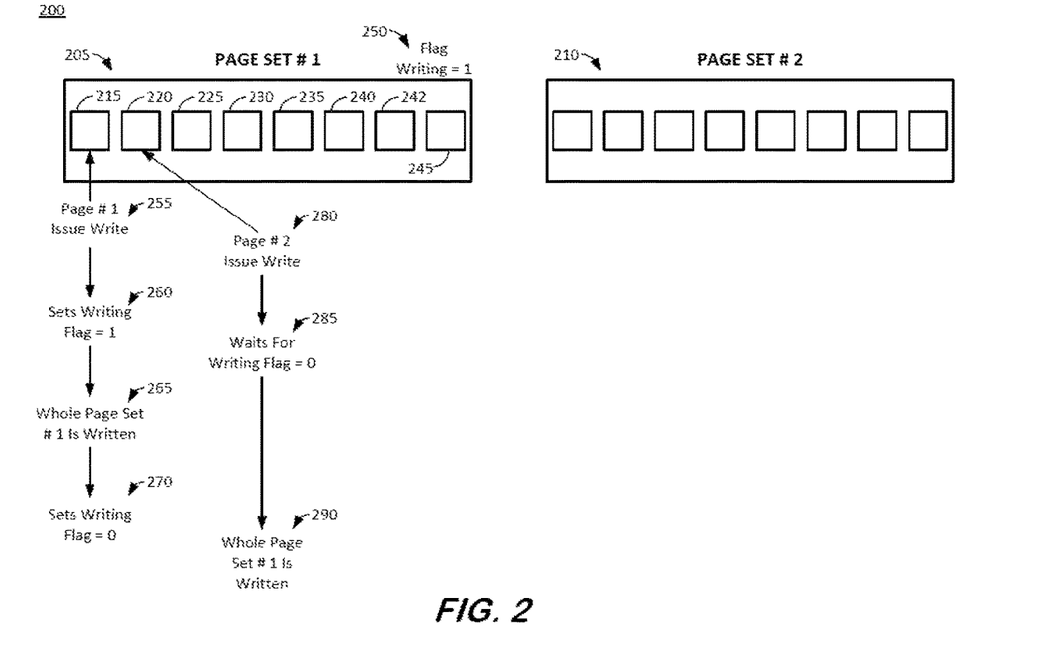
FIG. 2 is an illustrative depiction of same aspects of writing database pages, according to some prior systems and methods.

FIG. 2 is an illustrative depiction of some aspects of a process 200 for writing database pages, according to some prior systems and methods. In some embodiments, the database pages of the database for the example of FIG. 2 are logically organized in page sets, where each page set includes a plurality of database pages. The quantity of pages in each page set may be specified to include a predefined number of database pages. As an example, each page set in the example of FIG. 2 (and other examples herein unless stated otherwise) is designed and configured to include eight (8) pages. In some embodiments, the number of database pages in a page set may be set to include a number other than eight (8) (e.g., a specified number between 2 and 12, etc.).

Referring to FIG. 2, page set 1 (205) includes eight (8) pages, including pages 215, 220, 225, 230, 235, 240, 242, and 245, where each page has a timestamp associated therewith (e.g., in a header, metadata, or other data structure aspect of each respective database page). Each page set (e.g., 205, 210) has a write flag associated therewith (e.g., flag 250 associated with page set 205) to indicate that the pages in the page set are being written. The write flag 250 for page set 205 may be set to 1 when a write is issued on a page in the page set. As an example of a prior database writing process, the example of FIG. 2 includes a scenario where a timestamp for a database (e.g., a database in accordance with FIG. 1) is reset, including updating the database pages of the database with a new timestamp and writing the updated database pages to a persistent data store of the database.

According to the example of FIG. 2, when a write is issued on a page (e.g., page 215) in page set 205, all of the pages (e.g., pages 215, 220, 225, 230, 235, 240, 242, and 245) are all written to the persistent data store. For example, a write is issued for the first page 215 in page set 205, as illustrated at 255, and the write flag 250 for page set 205 is set to 1 as illustrated at 260. In response, the timestamp for page 215 is updated and the entire page set 250, including all of the database pages therein, is written to disk (e.g., FIG. 1, persistent data store 135), as stated at 265. Upon completion of the writing of the entire page set, the write flag 250 is set to 0 to indicate the no writing of the pages of page set 205 is in process, as shown at 270. The write process of the example of FIG. 2 then the proceeds to write page 220 in a manner like that used to write page 215. For example, a write is issued for the second page, 220, in page set 205, as illustrated at 280. However, the writing of page 220 is prevented from starting until the write flag 250 is released (e.g., write flag set to 0) by the completion of the writing of page 215, as shown at 285. Once the write flag is set to 0, the writing of page 220 can commence. Accordingly, the write flag 250 for page set 205 is set to 1 to indicate the writing of page(s) in page set 205. In response, the timestamp for page 220 is updated and the entire page set 250, including all of the database pages therein, is again written to disk, as stated at 290. Upon completion of the writing of the entire page set, the write flag 250 is set to 0 to indicate the no writing of the pages of page set 205 is in process. Each of the remaining pages 225, 230, 235, 240, 242, and 245 in page set 205 are written to disk in a manner similar to that disclosed above regarding pages 215 and 220 until all of the pages in page set 205 are updated with a new timestamp (as appropriate) and (re-)written to the persistent data store of the database.

As highlighted by the example of FIG. 2, for every write issued on a page in the page set 205 (i.e., eight (8) issued writes in the present example), all of the pages (i.e., 215, 220, 225, 230, 235, 240, 242, and 245) in the page set 205 are written to disk a corresponding number of times (i.e., each page in the page set is written eight (8) times). As such, in some aspects, a performance metric of the database of the example of FIG. 2 may be viewed as being degraded by about eight (8) times. For example, in one instance Applicant(s) of the present disclosure observed, for a 14 terabyte (TB) database, an elapsed time of about 8.5 days to reset the timestamp for the database using a process represented by the example of FIG. 2. In some aspects, the lengthy time to complete the process of the example of FIG. 2 may be attributable to, at least in part, the disadvantages of having to wait for the write flag to be released (e.g., set to 0) and writing all of the pages in the page set to disk each time a write is issued on a page in the page set.

Figure 3:
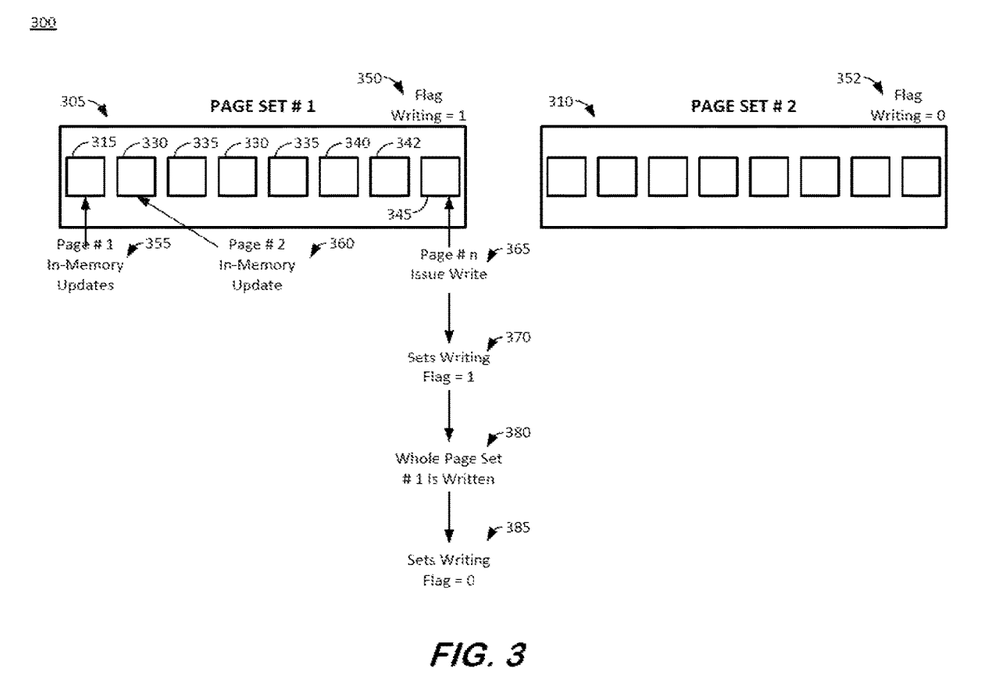
FIG. 3 is an illustrative depiction of same aspects of writing database pages, according to an example embodiment.

FIG. 3 is an illustrative depiction of same aspects of writing database pages, according to an example embodiment of the present disclosure. In some embodiments, the database pages of the database for the example of FIG. 3 are logically organized in page sets, where each page set includes a plurality of database pages and the quantity of pages in each page set may be specified to include a predefined number of database pages. In the example of FIG. 3, each page set 305 and 310 is designed and configured to include eight (8) pages. In some embodiments, the number of database pages in a page set may be set to include a number database pages other than eight (8) (e.g., a specified number between 2 and 12, etc.).

As illustrated in FIG. 3, page set 1 (305) includes eight (8) pages, including pages 315, 320, 325, 330, 335, 340, 342, and 345, where each page has a timestamp associated therewith (e.g., in a header, metadata, or other data structure aspect of each respective database page). Each page set 305 and 310 has a write flag associated therewith, including write flag 350 and write flag 352, respectively. In accordance with some embodiments of the present disclosure, the write flag for page sets of a database herein (e.g., a database of FIG. 1) may be configured to issue a write on one page in a page set. In some embodiments, the write flag for page sets of a database herein may be configured to issue a write on a last (or other designated page) in a page set. Accordingly, write flag 350 may be provided to indicate that a specified page (e.g., the last (or other designated) page) of the page set is being written. For example, the write flag 350 for page set 305 may be set to 1 when a write is issued on the last (or other designated) page in the page set.

As an illustrative example of a database page writing process of the present disclosure, the example of FIG. 3 includes a scenario where a timestamp for a database (e.g., a database in accordance with FIG. 1) is reset, including updating the database pages of the database with a new timestamp and writing the updated database pages to a persistent data store of the database.

According to the example of FIG. 3, when a write is issued on the last (or other designated) page (e.g., page 345) in page set 305, all of the pages (e.g., pages 315, 320, 325, 330, 335, 340, and 345) are written to the persistent data store of the database (e.g., FIG. 1, persistent data store 135). For example, a request to update a timestamp associated with database pages of a database instance is received. In some embodiments, the "request" might be embodied in a message, an instruction, a command, a service call, an API (application programming interface) call, etc. In reply to receiving the request, the database pages in page set 305 may each be updated with a new/updated timestamp in a memory (e.g., "in-memory" cache, RAM (random-access memory), a buffer or the like) as indicated in FIG. 3 by reference numerals 355 and 360 pertaining to database pages 315 (i.e., a first page in page set 305) and 320 (i.e., a second page in page set 305). The timestamp of each of the database pages in page set 305 is updated in a similar manner (i.e., in-memory) until a last (or other designated) database page (e.g., page 345) in the page set is reached. In response to updating the timestamp associated with the last (or other designated) database page in the page set, a write is issued for page set 305, as shown in FIG. 3 at reference numeral 365. The write flag 350 for page set 305 is further set to 1 (or some other specified value to indicate writing of the page(s) in the page set), as illustrated at 370. In response, the plurality of database pages (i.e., pages 315, 320, 325, 330, 335, 340, 342, and 345) in page set 305 are all written to the persistent data store of the database.

As highlighted by the example of FIG. 3, a write is issued on just one page in the page set 305 (e.g., one (1) write issued on the last page (345) in the present example). Accordingly, the pages (i.e., 315, 320, 325, 330, 335, 340, 342, and 345) in the page set 305 are written just once. As such, in some aspects, a performance metric of the database of the example of FIG. 3 may be viewed as being significantly improved, as compared to other database page writing processes and techniques (e.g., the example of FIG. 2). For example, in one instance Applicant(s) of the present disclosure observed, for a 14 terabyte (TB) database, an elapsed time of about 16 hours to reset the timestamp for the database using a process represented by the example of FIG. 3. In some aspects, the reduced (i.e., improved) time to complete the process of the example of FIG. 3 may be attributable to, at least in part, the advantages and benefits of not having to wait for a write flag to be released (e.g., set to 0) and writing each of the pages in the page set just one time (i.e., once) based on a write issued for the page set. In some instances, for example where a database might be operated in single user mode during an execution of the database pages write process of FIG. 3, some aspects of the process exemplified in FIG. 3 provide a mechanism to reduce the downtime of the database (in some use cases significantly).

Figure 4:
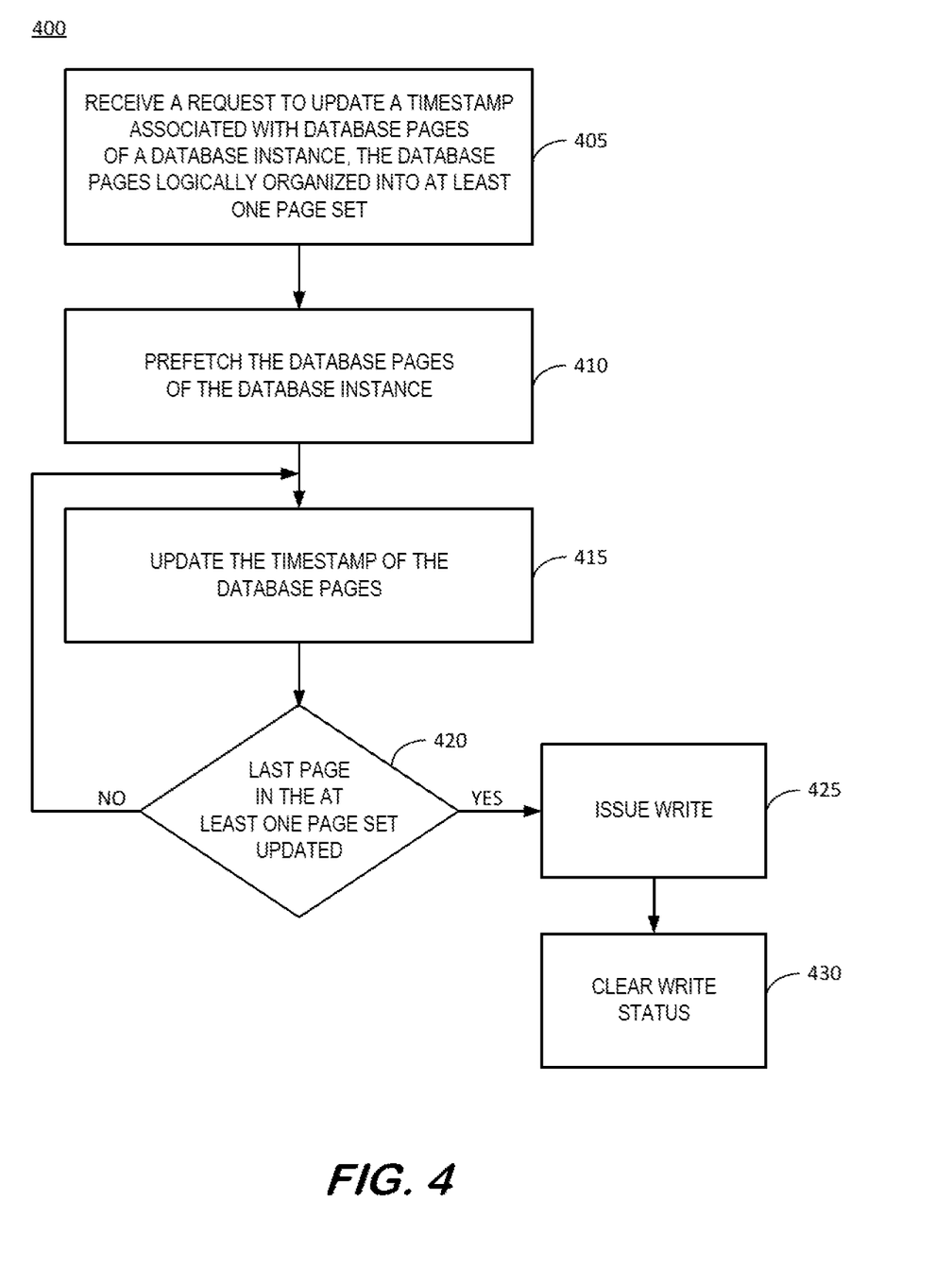
FIG. 4 is an illustrative process flow, according to an example embodiment.

FIG. 4 is an illustrative flow diagram for a process 400 related to a process for writing database pages, according to an example embodiment. In some aspects, process 400 provides an overview of a process that might incorporate some of the aspects disclosed above regarding the example of FIG. 3. In some regards, aspects of process 400 have or may be understood by referencing the example in FIG. 3. Accordingly, the following discussion of process 400 may avoid repeating aspects disclosed elsewhere in the present disclosure and not as an indication that such features are not or cannot be included in some embodiment of process 400.

At operation 405, a request to update a timestamp associated with database pages of a database instance is received. In some embodiments, the database pages of the database for the example of FIG. 4 are logically organized in page sets, where each page set includes a plurality of database pages and the quantity of pages in each page set may be specified to include a predefined number of database pages. In some aspects, a utility, application, service, processing thread, system, or device implementing aspects of the present disclosure of a process for writing database pages loops over database pages of the database (e.g., all or a portion of the database pages of the database).

At operation 410, the database pages determined to be subject to the database pages writing process herein may be prefetched in an effort to, for example, have the pages readily available in a cache before the database page writing process herein places a request on the pages.

At operation 415, database pages, for example, the pages of a page set, may be marked for writing and further updated in memory (e.g., a cache) with an updated or new timestamp. In an instance the reason or purpose for writing the database pages is related to a function other than resetting the timestamp of the database, operation 415 may include another processing job or function in addition to or instead of updating the timestamp associated with each of the database pages marked for writing. For example, operation 415 might include a functionality to modify another aspect of the database pages (e.g., a security-related indicator, a data expiry date, etc.).

Continuing to operation 420, a determination is made whether a last (or other designated) page in the page set has been updated. If the last (or other designated) page in the page set has not been updated, then process 400 reverts to operation 415 to continue updating the timestamps of the next page(s) in the page set in memory. In the instance it is determined at operation 420 that the last (or other designated) page in the page set has been updated, then process 400 proceeds to operation 425 to issue a write for the page set. Accordingly, a write flag for the page set is set to 1 (or some other specified value to indicate writing of the page(s) in the page set) and the plurality of database pages in the page set are written (just once) to the persistent data store of the database. Upon completion of the writing the database pages, the write flag for the page set may be cleared or reset (e.g., set to 0 or some other specified value) to indicate no active writing of the page(s) in the page set, as indicated at operation 430.

In some embodiments, a system and process to write database pages as disclosed herein (e.g., processes disclosed with regards to the examples in FIGS. 3 and 4) may read and write the database pages updated or otherwise modified thereby sequentially with a single processing thread. In accordance with some aspects herein, a system and a process to write database pages as disclosed herein may be implemented by multiple parallel processing threads. In some embodiments, parallel processing of a database page writing process herein may include multiple threads working on mutually exclusive page sets to update the timestamp of a database (or a portion of the database). In some aspects, the parallel processing threads may be configured to update the timestamp of the database such that, for example, no two threads are executing on the same page, no two threads are executing on the same OS (operating system) device, and no two threads are executing on same page set.

In some aspects, the present disclosure provides some embodiments for writing database pages in parallel, at least sometimes, with a plurality of processing threads. In some embodiments, in an instance the number of database pages is N and the number of devices is m, then m threads may be created such that there is a one-to-one (i.e., 1:1) mapping between processing threads and devices, wherein e processing thread will be executing on pages on a respective device.

Figure 5:
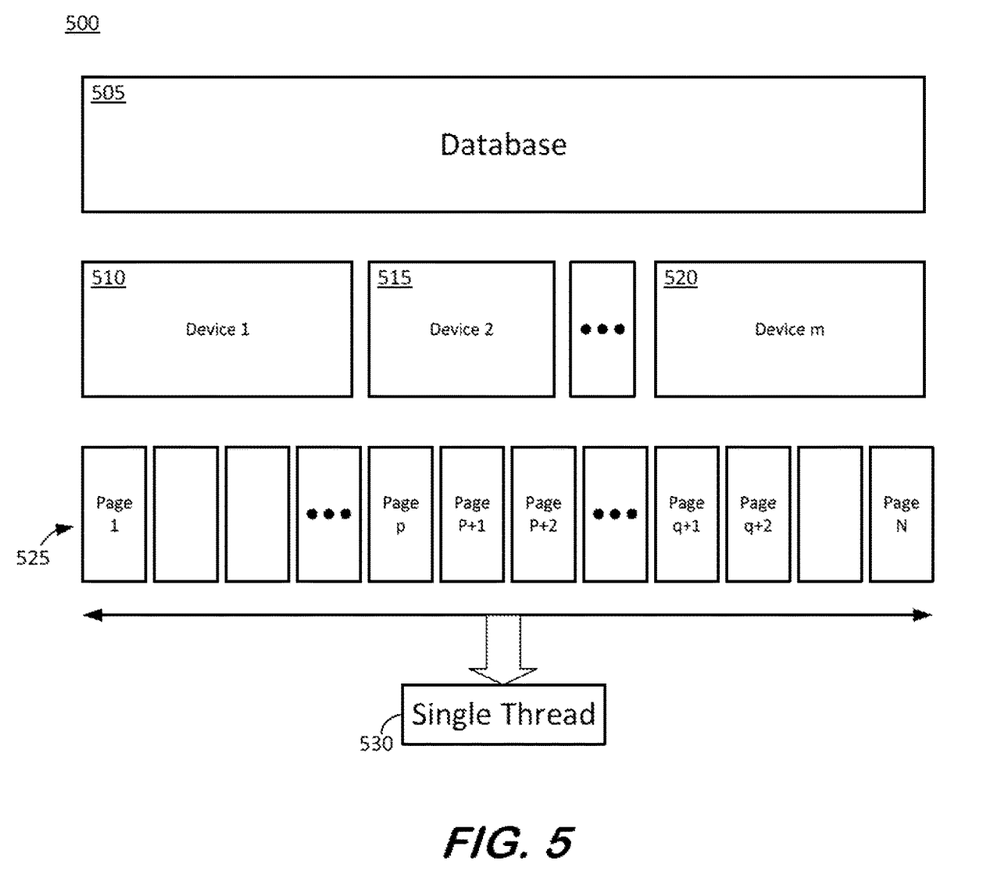
FIG. 5 is an illustrative depiction of a process for writing database pages, according to some example embodiments.

FIG. 5 is an illustrative depiction of a process for writing database pages, according to some example embodiments. In some aspects, FIG. 5 is an illustrative depiction of a serial processing model 500 for writing database pages, in accordance with an example embodiment. As shown in FIG. 5, database 505 includes multiple devices 510, 515, and 520 (e.g., severs or database instances executing code to implement the database). Database pages of the database, collectively referred to by reference numeral 525, may be updated in a cache of the database and worked on serially by a single processing thread 530 to write the database pages in accordance with the processes disclosed herein (e.g., FIGS. 3 and 4). In this example, there are m devices and 1 processing thread.

Figure 6:
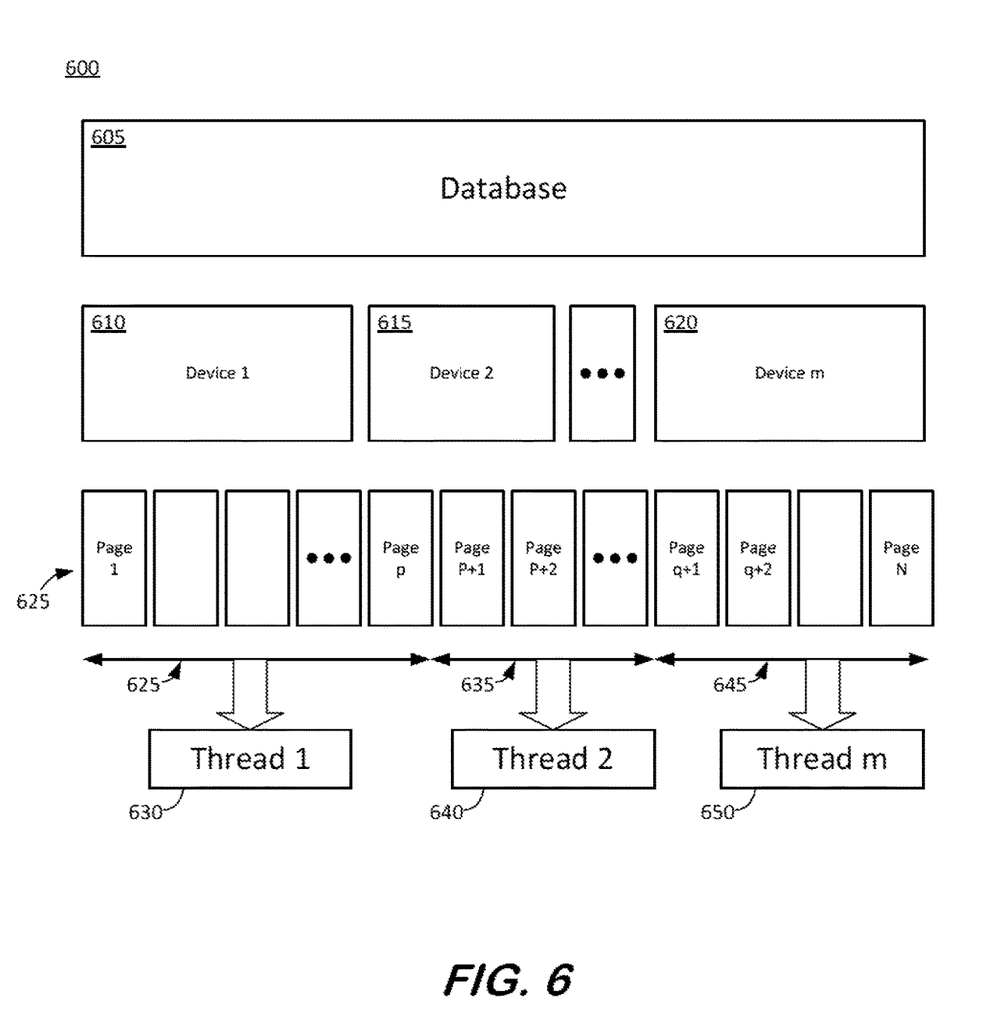
FIG. 6 is an illustrative depiction of another process for writing database pages, according to an example embodiment.

FIG. 6 is an illustrative depiction of another process for writing database pages, according to an example embodiment. In some aspects, FIG. 6 is an illustrative depiction of a parallel processing model 600 for writing database pages, in accordance with an example embodiment. As depicted in FIG. 6, database 605 includes multiple devices 610, 615, and 620 for implementing the database (e.g., similar to the devices 510, 515, and 520 in FIG. 5). Database pages of the database, referenced at 625, 635, and 645, may be updated in a cache of the database and may be worked on in parallel by the multiple, different processing threads 630, 640, and 650, where each of the processing threads is configured to write the database pages in accordance with the processes disclosed herein (e.g., FIGS. 3 and 4). In this illustrative example, there are m devices (e.g., devices 610, 615, and 620) and a corresponding number of m processing threads, where m=3.

Figure 7:
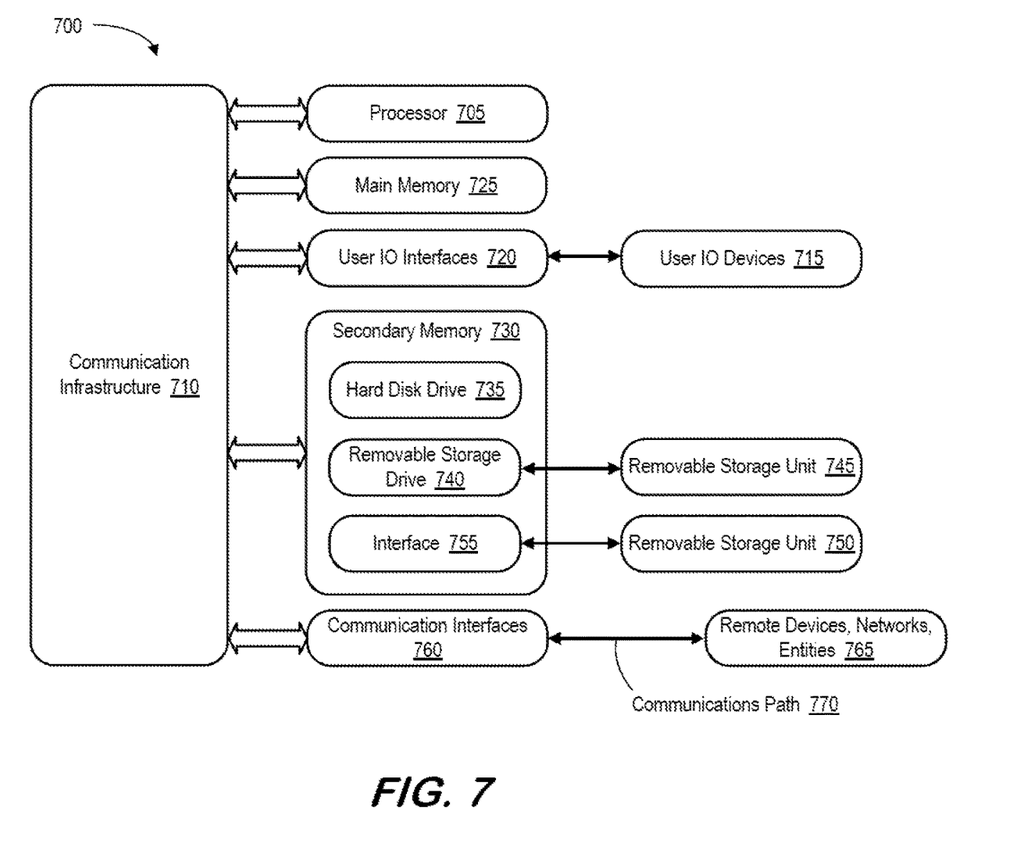
FIG. 7 is a block diagram of an apparatus useful for implementing various aspects disclosed herein, according to some example embodiments.

Various embodiments of a collaboration system and service disclosed herein may be implemented, for example, using one or more computer systems, such as computer system 700 shown in FIG. 7. The computer system 700 can be any computer capable of performing the functions described herein. Computer system 700 includes one or more processors (also called CPUs), such as a processor 705. Processor 705 is connected to a communication infrastructure or bus 710.

One or more processors 705 may each be a Graphics Processing Unit ("GPU"). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 715, such as monitors, keyboards, pointing devices, etc., that communicate with communication infrastructure xx06 through user input/output interface(s) 720.

Computer system 700 also includes a main or primary memory 725, such as Random-Access Memory ("RAM"). Main memory 725 may include one or more levels of cache. Main memory 725 has stored therein control logic (i.e., computer software) and/or data.

Computer system 700 may also include one or more secondary storage devices or memory 730. Secondary memory 730 may include, for example, a hard disk drive 735 and/or a removable storage device or drive 740. Removable storage drive 740 may be a floppy disk drive, a magnetic tape drive, a compact disk drive, an optical storage device, tape backup device, and/or any other storage device/drive.

Removable storage drive 740 may interact with a removable storage unit 745. Removable storage unit 745 includes a computer usable or readable storage device having stored thereon computer software (control logic) and/or data. Removable storage unit 745 may be a floppy disk, magnetic tape, compact disk, DVD, optical storage disk, and/any other computer data storage device. Removable storage drive 740 reads from and/or writes to removable storage unit 745 in a well-known manner.

According to an exemplary embodiment, secondary memory 730 may include other means, instrumentalities or other approaches for allowing computer programs and/or other instructions and/or data to be accessed by computer system 700. Such means, instrumentalities or other approaches may include, for example, a removable storage unit 750 and an interface 755. Examples of the removable storage unit 750 and the interface 755 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 760. Communication interface 760 enables computer system 700 to communicate and interact with any combination of remote devices, remote networks, remote entities, etc. (individually and collectively referenced by reference number 765). For example, communication interface 760 may allow computer system 700 to communicate with remote devices 765 over communications path 770, which may be wired and/or wireless, and which may include any combination of LANs, WANs, the Internet, etc. Control logic and/or data may be transmitted to and from computer system 700 via communication path 770.

In an embodiment, anon-transitory tangible apparatus or article of manufacture comprising a tangible computer useable or readable medium having control logic (software) stored thereon is also referred to herein as a computer program product or program storage device. This includes, but is not limited to, computer system 700, main memory 725, secondary memory 730, and removable storage units 745 and 750, as well as tangible articles of manufacture embodying any combination of the foregoing. Such control logic, when executed by one or more data processing devices (such as computer system 700), causes such data processing devices to operate as described herein.

Based on the present disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

Although specific hardware and data configurations have been described herein, note that any number of other configurations may be provided in accordance with some embodiments of the present invention (e.g., some of the information associated with the databases and storage elements described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. Embodiments are therefore not limited to any specific combination of hardware and software.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments disclosed herein are solely for the purpose of illustration. Those in the art will recognize other embodiments may be practiced with modifications and alterations to that described above.

What is claimed is:

1. A computer-implemented method, the method comprising:
 receiving a request to update a timestamp associated with database pages of a database instance, the database pages logically organized into at least one page set, each of the at least one page set including a plurality of the database pages;

updating, for each of the at least one page set, the timestamp associated with each database page in each respective at least one page set;

issuing, in response to updating the timestamp associated with a last database page in each of the at least one page set, a write request to write the plurality of database pages in each of the respective at least one page set to a persistent data store;

setting, in response to issuing the write request for each of the respective at least one page set, a writing flag for each of the respective at least one page set to indicate an executing of the writing of the plurality of database pages;

writing the plurality of database pages in each of the respective at least one page set to a persistent data store, the plurality of database pages written to the persistent data store having an updated timestamp associated therewith; and setting, in response to a completion of the executing of the writing of the plurality of database pages, the writing flag for each of the respective at least one page set to indicate a non-executing of the writing of the plurality of database pages.

2. The method of claim 1, wherein each of the at least one page set includes a predefined plurality of the database pages.

3. The method of claim 1, wherein the write request is issued only once in response to updating the timestamp associated with the last database page in each of the at least one page set.

4. The method of claim 1, wherein the write request is issued to write all of the plurality of database pages in each of the respective at least one page set to the persistent data store.

5. The method of claim 1, wherein the method is performed by a plurality of processing threads operating at least periodically in parallel, each of the plurality of processing threads executing on mutually exclusive page sets of the at least one page set.

6. A system comprising: at least one programmable processor; and a non-transitory machine-readable medium storing instructions that, when executed by the at least one programmable processor, cause the at least one programmable processor to perform operations comprising:

receiving a request to update a timestamp associated with database pages of a database instance, the database pages logically organized into at least one page set, each of the at least one page set including a plurality of the database pages;

updating, for each of the at least one page set, the timestamp associated with each database page in each respective at least one page set;

issuing, in response to updating the timestamp associated with a last database page in each of the at least one page set, a write request to write the plurality of database pages in each of the respective at least one page set to a persistent data store;

setting, in response to issuing the write request for each of the respective at least one page set, a writing flag for each of the respective at least one page set to indicate an executing of the writing of the plurality of database pages;

writing the plurality of database pages in each of the respective at least one page set to a persistent data store, the plurality of database pages written to the persistent data store having an updated timestamp associated therewith; and setting, in response to a completion of the executing of the writing of the plurality of database pages, the writing flag for each of the respective at least one page set to indicate a non-executing of the writing of the plurality of database pages.

7. The system of claim 6, wherein each of the at least one page set includes a predefined plurality of the database pages.

8. The system of claim 6, wherein the write request is issued only once in response to updating the timestamp associated with the last database page in each of the at least one page set.

9. The system of claim 6, wherein the write request is issued to write all of the plurality of database pages in each of the respective at least one page set to the persistent data store.

10. The system of claim 6, wherein the operations performed by the at least one programmable processor are performed by a plurality of processing threads operating at least periodically in parallel, each of the plurality of processing threads executing on mutually exclusive page sets of the at least one page set.

11. A non-transitory, computer readable medium storing instructions, which when executed by at least one processor cause a computer to perform a method comprising:

receiving a request to update a timestamp associated with database pages of a database instance, the database pages logically organized into at least one page set, each of the at least one page set including a plurality of the database pages;

updating, for each of the at least one page set, the timestamp associated with each database page in each respective at least one page set;

issuing, in response to updating the timestamp associated with a last database page in each of the at least one page set, a write request to write the plurality of database pages in each of the respective at least one page set to a persistent data store;

setting, in response to issuing the write request for each of the respective at least one page set, a writing flag for each of the respective at least one page set to indicate an executing of the writing of the plurality of database pages;

writing the plurality of database pages in each of the respective at least one page set to a persistent data store, the plurality of database pages written to the persistent data store having an updated timestamp associated therewith; and setting, in response to a completion of the executing of the writing of the plurality of database pages, the writing flag for each of the respective at least one page set to indicate a non-executing of the writing of the plurality of database pages.

12. The medium of claim 11, wherein each of the at least one page set includes a predefined plurality of the database pages.

13. The medium of claim 11, wherein the write request is issued only once in response to updating the timestamp associated with the last database page in each of the at least one page set.

14. The medium of claim 11, wherein the write request is issued to write all of the plurality of database pages in each of the respective at least one page set to the persistent data store.

15. The medium of claim 11, wherein the method is performed by a plurality of processing threads operating at least periodically in parallel, each of the plurality of processing threads executing on mutually exclusive page sets of the at least one page set.

\* \* \* \* \*